CONTROL SYSTEM

Filed Oct. 14, 1958

INVENTORS
JAMES LONG
WILLIAM R. MILLER

BY Vernon F. Kalb

THEIR ATTORNEY

United States Patent Office 2,982,907

Patented May 2, 1961

2,982,907

CONTROL SYSTEM

James Long and William R. Miller, Erie, Pa., assignors to General Electric Company, a corporation of New York Filed Oct. 14, 1958, Ser. No. 767,189

11 Claims. (Cl. 322—18)

This invention is a control system which can provide linear acceleration or deceleration of motor driven equipment, independent of load. One use is in continuous flow production where conveyors and related equipment driven by one or more motors have to be accelerated or decelerated at coordinated rates.

The control voltage is obtained from a condenser which is charged or discharged at a constant rate by a combination of a constant voltage source and a feed back voltage acting to produce constant charging current. The condenser voltage is fed into a low input impedance amplifier and the feed back voltage is brought back from the amplifier output. The total feed back may be considered to consist of three parts: One, a voltage always equal to the condenser voltage; second, a voltage sufficient, when divided by the feed back resistance, to supply the current drain at the amplifier input and third, a constant voltage riding on the first two to charge the condenser at a constant rate. The net effect of this feed back voltage is that the rate at which current flows into or out of the condenser is unaffected by its previous history.

Figure 1:
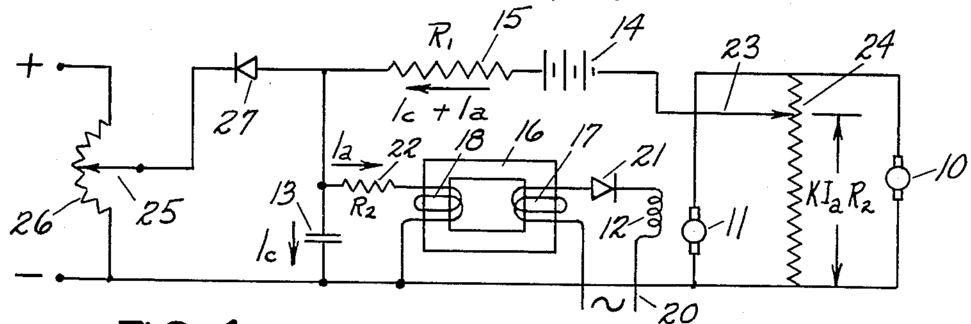
Figure 3:
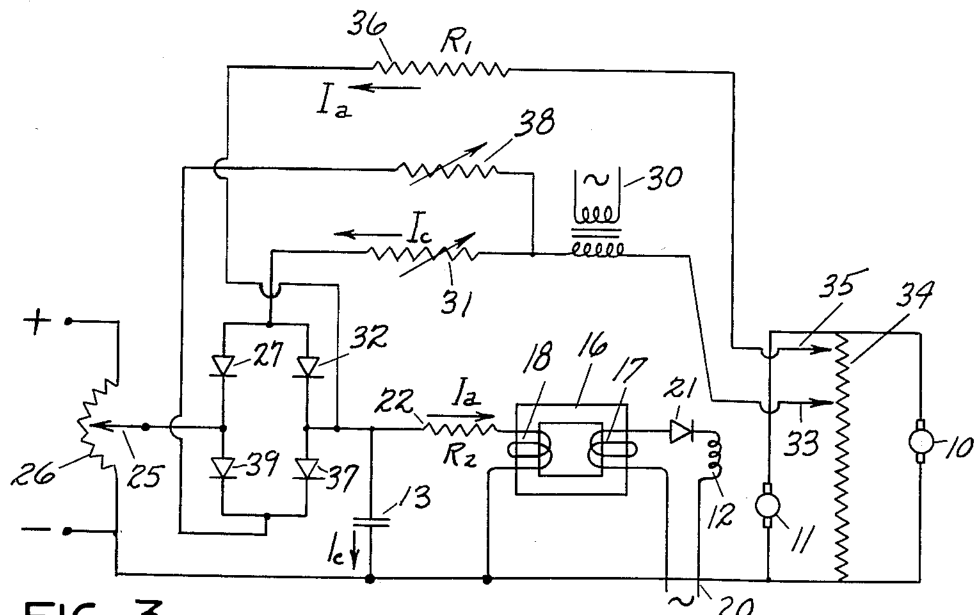
Figure 2:
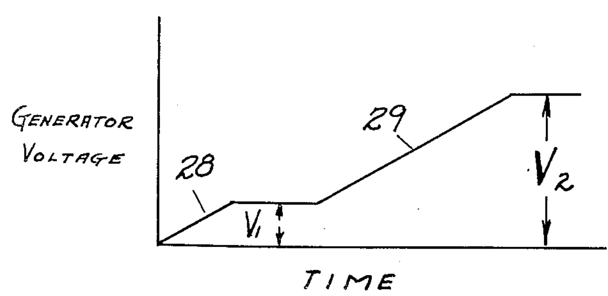

In the drawing, Fig. 1 is a circuit diagram of a simplified system; Fig. 2 is a performance curve; and Fig. 3 is a circuit diagram of a more complete system.

In the Fig. 1 system, one or more D.C. motors 10 which run at speeds proportional to the applied voltage are supplied by a D.C. generator 11 having an exciting field winding 12. The motor speed can accordingly be controlled by varying the voltage across the field winding.

The control voltage used to vary the voltage across the generator field winding originates in a condenser 13 which is charged by a battery 14 or other constant voltage source through a resistor 15 ($R_1$) which determines the rate of flow of charging current into the condenser. By charging the condenser at constant current, the condenser voltage rises linearly and provides the source of control voltage used to provide a linear increase in the voltage of the generator 11.

The voltage across the condenser 13 is fed to the generator field winding 12 through a saturable core magnetic amplifier 16 in which the output appearing in winding 17 is linearly proportional to the input fed to winding 18. The amplifier input winding 18 is connected across the condenser 13 through an input resistance 22 ($R_2$). The amplifier output winding 17 is connected across a power supply 20 in series with a diode 21 and the generator field winding 12. The output voltage of the generator accordingly is directly proportional to the voltage across the condenser 13.

To hold the condenser charging current constant, it is necessary that the battery 14 be supplemented by a feed back voltage which will not only balance out the voltage across the condenser but will also supply the current drain of the amplifier. This feed back voltage is conveniently taken from a tap 23 on a voltage divider 24 connected across the generator 12. At tap 23, the voltage is equal to a constant K times the voltage ($I_aR_2$) across the input of the amplifier (K times the condenser voltage), where the constant K is always greater than one. The condition for constant charging current ($I_c$) of the condenser 13 is satisfied when the tap 23 is adjusted so that its voltage is equal to the resistance drop of the amplifier drain current ($I_a$) through the resistances 15 and 22. With this adjustment, the battery 14 is only called upon to move the condenser charging current through the resistance 15. Mathematically, this can be expressed as:

(1) Battery voltage—$E=I_cR_1=$constant (2) Voltage at tap 23$=KI_aR_2=I_aR_1+I_aR_2$ Note from Equation 2 that the amplification factor K of Equation 2 is equal to $$\frac{R_1+R_2}{R_2}$$

and is accordingly always greater than 1. This is necessary because the voltage fed back from the generator output must not only balance out the voltage across the condenser 13 ($I_aR_2$) but must also supply an additional voltage ($I_aR_2$) to compensate for the current drain of the amplifier through the condenser charging resistance. So long as these conditions are satisfied, the rate of charging of the condenser to the amplifier 16 increases linearly. The limit to which the voltage across the condenser 13 can rise is set by a reference voltage at a manually adjustable tap 25 on a voltage divider 26. This reference voltage is connected to the condenser 13 through a diode 27 which blocks flow of current from the reference voltage into the condenser. Once the condenser voltage reaches the value of the reference voltage at tap 25 and tries to exceed it, current drains through the diode 27 preventing any increase in the condenser voltage.

When the motors 10 are stopped, the tap 25 will be in the zero position and there will be no voltage across the condenser 13. To start the motors, the tap 25 is moved to a voltage corresponding to the speed desired. For example, in a production line conveyor, it might be desirable to start the conveyor at a slow speed and then move to full speed operation. This could be done by setting the tap 25 initially to a low voltage corresponding to low speed operation permitting the condenser 13 to charge linearly as indicated at 28 in Fig. 2 until the condenser voltage reaches the voltage set by the tap 25 and designated as $V_1$. After an interval of time in which it was determined that all parts of the conveyor were operating properly, the tap 25 would then be moved to the full speed position permitting the condenser 13 to charge linearly along the line indicated at 29 in Fig. 2 until the condenser voltage reached the reference voltage designated as $V_2$. As the condenser charges, the output voltage of the generator 11 supplying the motors 10 increases in direct proportion to the condenser voltage, thereby providing a linear increase in speed of the motors 10 desirable to prevent excessive strain on the equipment and for other reasons.

It will be noted that the linear acceleration is obtained with a minimum of moving parts. After the speed is selected by the tap 25 on the voltage divider 26, the motors 10 accelerate linearly until that speed is reached. If faster acceleration is desired, the voltage of the battery or voltage source 14 may be increased or the size of the condenser 13 may be decreased. Conversely, slower acceleration may be obtained by increasing the size of the condenser 13 or by decreasing the voltage of the battery 14. In practical use, acceleration times of from 4 to 16 seconds are common and can be varied from as low as 1 second or as high as 100 seconds.

In Fig. 3 is shown a more complete control system in which the parts corresponding to Fig. 1 are indicated by the same reference numerals. In this system the speed of the motors 10 is directly related to the voltage of the generator 11 and the generator voltage is determined by the voltage across the capacitor 13 which is fed through amplifier 16 to the generator field winding 12 in the same manner as in Fig. 1.

When the reference voltage 25 is set to a value greater than the condenser voltage, the condenser is charged during the positive half cycles of an A.C. power supply 30 through a variable resistor 31 and a diode 32. As in Fig. 1, the maximum voltage to which the condenser 13 can be charged is limited by the reference voltage. With this arrangement, the rate at which the condenser 13 is charged can be varied by adjusting the variable resistance 31 which is easier than changing the size of the condenser or changing the magnitude of the charging voltage as was necessary in Fig. 1. In order that the condenser may be charged at a constant current, the voltage of the power supply 30 is supplemented by a feed back voltage from taps 33 and 35 on a voltage divider 34 connected across the generator. Since the generator voltage is directly proportional to the voltage across the condenser 13, the taps can be selected to balance out the condenser voltage and to supply the amplifier drain current. As illustrated, the tap 33 supplies a feed back voltage sufficient to move the condenser charging $I_c$ current through resistance 31 and the tap 35 supplies a feed back voltage sufficient to move the amplifier drain current through resistances 36 (equivalent to $R_1$) and 22 ($R_2$). For this condition the tap 35 would be set equal to a constant K times the voltage across the condenser 13 and when this constant K is selected to be equal to $$\frac{R_1+R_2}{R_2}$$

the voltage will supply the amplifier drain current and will not effect the voltage across the condenser 13. This satisfies the condition for linear charging of the condensers.

It is not essential that all of the amplifier drain current flow through resistance 36. In Fig. 1 all of the amplifier drain current flowed through the condenser charging resistance 15. It is possible to adjust the taps 33 and 35 so that tap 33 is greater than required to move the condenser charging current through the resistance 31 in which case some of the amplifier drain current will flow through the condenser charging resistance and the tap 35 may be of lower voltage because it need not supply the full amplifier drain current.

The operation of the Fig. 3 system during acceleration is the same as that shown in Fig. 2. The generator voltage, and therefore the speed of the motors 10 rises linearly in direct proportion to the voltage across the condenser 13 until the condenser voltage reaches the reference voltage selected by the tap 25 on the voltage divider 26. When the condenser voltage reaches the reference voltage, the charging current no longer flows into the condenser, but flows through diode 27.

The Fig. 3 system also has the advantage of controlling the speed of motors 2 to produce uniform deceleration as well as uniform acceleration.

During deceleration, the reference voltage from tap 25 is moved to a value lower than or negative with respect to the condenser voltage. The positive half cycles of the voltage 30 continue to bleed off through the diode 27 and during the positive half cycles discharge of the condenser is blocked by the diode 32. The negative half cycles of the voltage 30 can be considered as charging the condenser negatively (e.g. discharging the condenser) through diode 37 and deceleration resistor 38 until the condenser voltage due to the negative half cycle current reaches the reference voltage. Diode 39 is the counterpart of diode 27.

The same kind of analysis made for acceleration while the condenser is being charged positively applies for deceleration when the condenser is being charged negatively (or discharged). The negative half cycle current is amplified by the amplifier 16 and fed to the field winding producing a linear negative change in the generator voltage, which is fed back through taps 33 and 35 to balance out the amplifier drain current, and the relatively negative voltage produced on the condenser. The deceleration is accordingly linear and at a rate controlled by the resistor 38 which may be different from the acceleration resistor 31.

Transistor or other low impedance amplifiers capable of supplying the field winding current may be substituted in the circuits illustrated.

The invention is not limited to use with generators which are rotating units or dynamoelectric machines. There are many other generators known which are static conversion units, for example generators of the magnetic amplifier or ignitron type and these static generators are controllable in the same manner. The output of amplifier 16 may be used for other purposes not related to motor speed control.

What is claimed as new is:

1. In a system having equipment driven by motors which run at speeds corresponding to the voltage supplied by a generator with a separately excited field winding, the improvement for providing linear acceleration independent of load, which comprises a low input impedance amplifier having an output connected across the generator field winding, a condenser connected across the amplifier input whereby the generator voltage is proportional to the condenser voltage, a charging circuit for the condenser including a charging resistance and a power supply, and a feed back circuit from the output side of the amplifier supplying to the charging circuit a fraction of the output voltage of magnitude equal to the condenser voltage plus the voltage drop across the charging resistance caused by the amplifier drain current thereby keeping the rate of condenser charge constant.

2. In a system having equipment driven by motors which run at speeds corresponding to the voltage supplied by a generator with a separately excited field winding, the improvement for providing linear acceleration independent of load, which comprises an amplifier having an output connected across the generator field winding, a condenser connected across the amplifier input whereby the generator voltage is proportional to the condenser voltage, a charging circuit for the condenser including a charging resistance and a power supply, and two feed back circuits from the output side of the amplifier to the condenser, one feed back circuit primarily supplying the amplifier drain current and the other feed back circuit primarily supplying the condenser charging current.

3. In a system having equipment driven by motors which run at speeds corresponding to the voltage supplied by a generator with a separately excited field winding, the improvement for providing linear acceleration independent of load, which comprises a saturable core amplifier having an input coil and an output coil, the output coil being connected across the generator field winding, a condenser connected across the input coil whereby the generator voltage is proportional to the condenser voltage, a charging circuit for the condenser including a charging resistance and a power supply, and a feed back circuit from the output side of the amplifier supplying to the charging circuit a fraction of the output voltage a magnitude equal to the condenser voltage plus the voltage drop across the charging resistance caused by the amplifier drain current thereby keeping the rate of condenser charge constant.

4. In a timing circuit, a low input impedance amplifier having an output connected across a load, a condenser connected across the amplifier input whereby the current in the load is proportional to the condenser voltage, a charging circuit for the condenser including a charging resistance and a power supply, and a feedback circuit from the output side of the amplifier supplying to the charging circuit a fraction of the output voltage of magnitude equal to the condenser voltage plus the voltage drop across the charging resistance caused by the amplifier drain current thereby keeping the rate of condenser charge constant.

5. In a system having equipment driven by motors which run at speeds corresponding to the voltage supplied by a generator with a separately excited field winding, the improvement for providing linear acceleration independent of load, which comprises a low input impedance amplifier having an output connected across the generator field winding, a condenser connected across the amplifier input whereby the generator voltage is proportional to the condenser voltage, a charging circuit for the condenser for connection to an A.C. power supply, said charging circuit including a charging resistance and a diode for conducting charging current to the condenser during positive half cycles of the power supply, a reference voltage, another diode connected to bleed current from the charging circuit to the reference voltage whenever the condenser voltage tries to become more positive than the reference voltage, and a feed back circuit from the output side of the amplifier supplying to the charging circuit a voltage of magnitude equal to the condenser voltage plus the voltage drop across the charging resistance caused by the amplifier drain current thereby keeping the rate of condenser charge constant.

6. In a timing circuit, an amplifier having an output connected across a load, a condenser connected across the amplifier input whereby the current in the load is proportional to the condenser voltage, a charging circuit for the condenser including a charging resistance and a power supply, and two feed back circuits from the output side of the amplifier to the condenser, one feed back circuit primarily supplying the amplifier drain current and the other feed back circuit primarily supplying the condenser charging current.

7. In a control system, a generator with a voltage control winding, the improvement for providing linear change of the generator voltage, which comprises a low input impedance amplifier having an output connected across said winding, a condenser connected across the amplifier input whereby the generator voltage is proportional to the condenser voltage, a charging circuit for the condenser including a charging resistance, a power supply, and a feed back voltage from the generator of magnitude greater than the condenser voltage by an amount sufficient to supply the amplifier drain current thereby keeping the rate of condenser charge constant.

8. In a control system, a generator with a voltage control winding, the improvement for providing linear change of the generator voltage, which comprises an amplifier having an output connected across said winding, a condenser connected across the amplifier input whereby the generator voltage is proportional to the condenser voltage, a charging resistance, a power supply, a feed back voltage from the generator of magnitude greater than the condenser voltage by an amount sufficient to supply the amplifier drain current whereby the rate of condenser charge is constant, and a reference voltage settable to various levels connected across the condenser for limiting the condenser voltages and thereby the level of the generator voltage.

9. In a system having equipment driven by motors which run at speeds corresponding to the voltage supplied by a generator with a separately excited field winding, the improvement for providing linear acceleration and deceleration independent of load, which comprises an amplifier having an output connected across the generator field winding, a condenser connected across the amplifier input whereby the generator voltage is proportional to the condenser voltage, a circuit for charging and discharging the condenser from an A.C. power supply comprising a charging resistance connected through a first diode to the condenser to conduct on the positive half cycles of the power supply, a discharging resistance connected through a second diode to the condenser to conduct on the negative half cycles of the power supply, a reference voltage, a third diode connected to block flow of current during positive half cycles from the reference voltage into the condenser through the first diode but diverting current from the first diode to the reference voltage when the condenser voltage attempts to become more positive than the reference voltage, a fourth diode connected to block flow of current during negative half cycles from the reference voltage into the condenser but diverting current from the second diode when the condenser voltage attempts to become more negative than the reference voltage, a power supply, and a feed back voltage from the generator of magnitude greater than the condenser voltage by an amount sufficient to supply the amplifier drain current whereby the rate of condenser charge is constant.

10. In a system having equipment driven by motors which run at speeds corresponding to the voltage supplied by a generator with a separately excited field winding, the improvement for providing linear acceleration and deceleration independent of load, which comprises an amplifier having an output connected across the generator field winding, a condenser connected across the amplifier input whereby the generator voltage is proportional to the condenser voltage, a circuit for charging and discharging the condenser from an A.C. power supply comprising a charging resistance connected through a first diode to the condenser to conduct on the positive half cycles of the power supply, a discharging resistance connected through a second diode to the condenser to conduct on the negative half cycles of the power supply, a reference voltage, a third diode connected to block flow of current during positive half cycles from the reference voltage into the condenser through the first diode but diverting current from the first diode to the reference voltage when the condenser voltage attempts to become more positive than the reference voltage, a fourth diode connected to block flow of current during negative half cycles from the reference voltage into the condenser but diverting current from the second diode when the condenser voltage attempts to become more negative than the reference voltage, a power supply, and two feed back circuits from the output side of the amplifier to the condenser, one feed back circuit primarily supplying the amplifier drain current and the other feed back circuit primarily supplying the condenser charging current.

11. In a system having equipment driven by motors which run at speeds corresponding to the voltage supplied by a generator with a separately excited field winding, the improvement for providing linear acceleration and deceleration independent of load, which comprises a saturable core amplifier having an input coil and an output coil, the output coil being connected across the generator field winding, a condenser connected across the input coil whereby the generator voltage corresponds to the condenser voltage, a circuit for charging and discharging the condenser from an A.C. power supply comprising a charging resistance connected through a first diode to the condenser to conduct on the positive half cycles of the power supply, a discharging resistance connected through a second diode to the condenser to conduct on the negative half cycles of the power supply, a reference voltage, a third diode connected to block flow of current during positive half cycles from the reference voltage into the condenser through the first diode but diverting current from the first diode to the reference voltage when the condenser voltage attempts to become more positive than the reference voltage, a fourth diode connected to block flow of current during negative half cycles from the reference voltage into the condenser but diverting current from the second diode when the condenser voltage attempts to become more negative than the reference voltage, a power supply, and a feed back voltage from the generator of magnitude greater than the condenser voltage by an amount sufficient to supply the amplifier drain current whereby the rate of condenser charge is constant.

References Cited in the file of this patent

UNITED STATES PATENTS 2,629,847 Eames et al. ---------- Feb. 24, 1953

FOREIGN PATENTS 142,770 Sweden -------------- May 18, 1954